(12) United States Patent
Miura et al.

(10) Patent No.: US 7,981,240 B2
(45) Date of Patent: Jul. 19, 2011

(54) METHOD FOR MAKING VACUUM AIRTIGHT CONTAINER

(75) Inventors: Tokutaka Miura, Yokohama (JP); Mitsutoshi Hasegawa, Yokohama (JP); Kou Komatsu, Okazaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/551,215

(22) Filed: Aug. 31, 2009

(65) Prior Publication Data
US 2010/0065204 A1    Mar. 18, 2010

(30) Foreign Application Priority Data

Sep. 2, 2008 (JP) ................................. 2008-224818
Aug. 4, 2009 (JP) ................................. 2009-181486

(51) Int. Cl.
*B29C 65/02* (2006.01)
(52) U.S. Cl. ........... 156/285; 156/385; 156/60; 156/292
(58) Field of Classification Search .................. 156/385, 156/285
See application file for complete search history.

(56) References Cited

U.S. PATENT DOCUMENTS

| | | |
|---|---|---|
| 6,254,449 B1 | 7/2001 | Nakanishi et al. |
| 2006/0042316 A1 * | 3/2006 | Hasegawa et al. ............ 65/58 |

FOREIGN PATENT DOCUMENTS

| | | |
|---|---|---|
| EP | 1126496 | 8/2001 |
| JP | 11-135018 | 5/1999 |
| JP | 2001-229828 | 8/2001 |
| JP | 2004212987 A * | 7/2004 |
| JP | 2006-093117 | 4/2006 |

* cited by examiner

*Primary Examiner* — Philip C Tucker
*Assistant Examiner* — Vicki Wu
(74) *Attorney, Agent, or Firm* — Canon U.S.A., Inc. I.P. Division (57) ABSTRACT

Under a vacuum atmosphere, while keeping two members in contact with each other with a bonding material therebetween, one of the members is moved relative to the bonding surface in the horizontal direction, and the bonding material between the members is pressed. The surface oxide film of the bonding material, which is a low melting point metal, is thereby broken effectively, and highly hermetic bonding is performed.

4 Claims, 4 Drawing Sheets

METHOD FOR MAKING VACUUM AIRTIGHT CONTAINER

BACKGROUND OF THE INVENTION

1. Field of the Invention

The present invention relates to a method for making a vacuum airtight container. More specifically, it relates to a method for making a vacuum airtight container used in a flat panel display.

2. Description of the Related Art

In a method for making a vacuum airtight container used in a flat panel display, it is important to accurately align a front substrate and a rear substrate to each other before bonding and to perform highly airtight sealing, and these are required to be performed at low cost.

Japanese Patent Laid-Open No. 2001-229828 (corresponding to EP 1126496) discloses a low-cost bonding technique in which a front substrate and a rear substrate are bonded in a vacuum chamber using a low melting point metal as a bonding material. By using a low melting point metal as a bonding material, the time required for heating and cooling can be reduced. Therefore, the takt time can be reduced, and the bonding cost can be reduced.

Japanese Patent Laid-Open No. 11-135018 (corresponding to US 2001/0009836) discloses a technique for accurate alignment and bonding in which bonding is performed while performing alignment in a vacuum chamber. Since alignment is performed in a vacuum chamber in this technique, this technique requires a mechanism that measures the relative positions of the front substrate and the rear substrate in the vacuum chamber and corrects the positions. This increases the cost of the apparatus, and therefore a production method using a simple apparatus is desired.

Japanese Patent Laid-Open No. 2006-093117 (corresponding to US 2006/0042316) discloses a technique in which a low melting point metal is used as a bonding material, and a front substrate and a rear substrate are aligned to each other beforehand and then bonded in a vacuum chamber. According to this technique, a low melting point metal is used as a bonding material, and alignment is performed beforehand in air. Therefore, the vacuum chamber need not be provided with an alignment mechanism, and the cost can be reduced. However, from the viewpoint of airtightness, there is still room for improvement.

SUMMARY OF THE INVENTION

The present invention provides a method for making a vacuum airtight container that is highly hermetically sealed and in which a front substrate and a rear substrate are highly accurately aligned to each other, using a low melting point metal as a bonding material at low cost.

In an aspect of the present invention, a method for making a vacuum airtight container includes the steps of (a) disposing a bonding material of metal on a bonding surface of at least one of a first member and a second member constituting the vacuum airtight container, (b) bringing the first member and the second member into contact with each other with the bonding material therebetween and holding the first member and the second member in a bonding position, (c) moving at least one of the first member and the second member held in the bonding position relative to the other so as to extend the distance between the first member and the second member, (d) heating the bonding material above a temperature at which the bonding material melts, (e) bringing the first member and the second member into contact with each other with the heated bonding material therebetween, moving at least one of the first member and the second member in a direction parallel to the bonding surface while keeping the first member and the second member in contact with each other, and thereby returning the first member and the second member to the bonding position while pressing the bonding material, and (f) bonding the first member and the second member returned to the bonding position by cooling and solidifying the bonding material. The steps (c), (d), (e), and (f) are performed under a vacuum atmosphere.

The method of the present invention breaks the surface oxide film of a low melting point metal used as a bonding material. Therefore, a vacuum airtight container that is highly hermetically sealed and in which a front substrate and a rear substrate are highly accurately aligned to each other can be made at low cost.

Further features of the present invention will become apparent from the following description of exemplary embodiments with reference to the attached drawings.

DESCRIPTION OF THE EMBODIMENTS

The embodiments of the present invention will now be described.

The vacuum airtight containers made by the method of the present invention include a vacuum airtight container for a flat panel display (hereinafter referred to as FPD). In particular, a field emission display (hereinafter referred to as FED) and a surface-conduction electron emitter display (hereinafter referred to as SED) require a vacuum airtight container. Therefore, the present invention is suitable for these displays. The embodiments of the present invention will be specifically described, taking an SED as an example. However, the present invention can be applied not only to a vacuum airtight container for a display such as an SED but to any vacuum airtight container formed by bonding two members (a first member and a second member).

Figure 1:
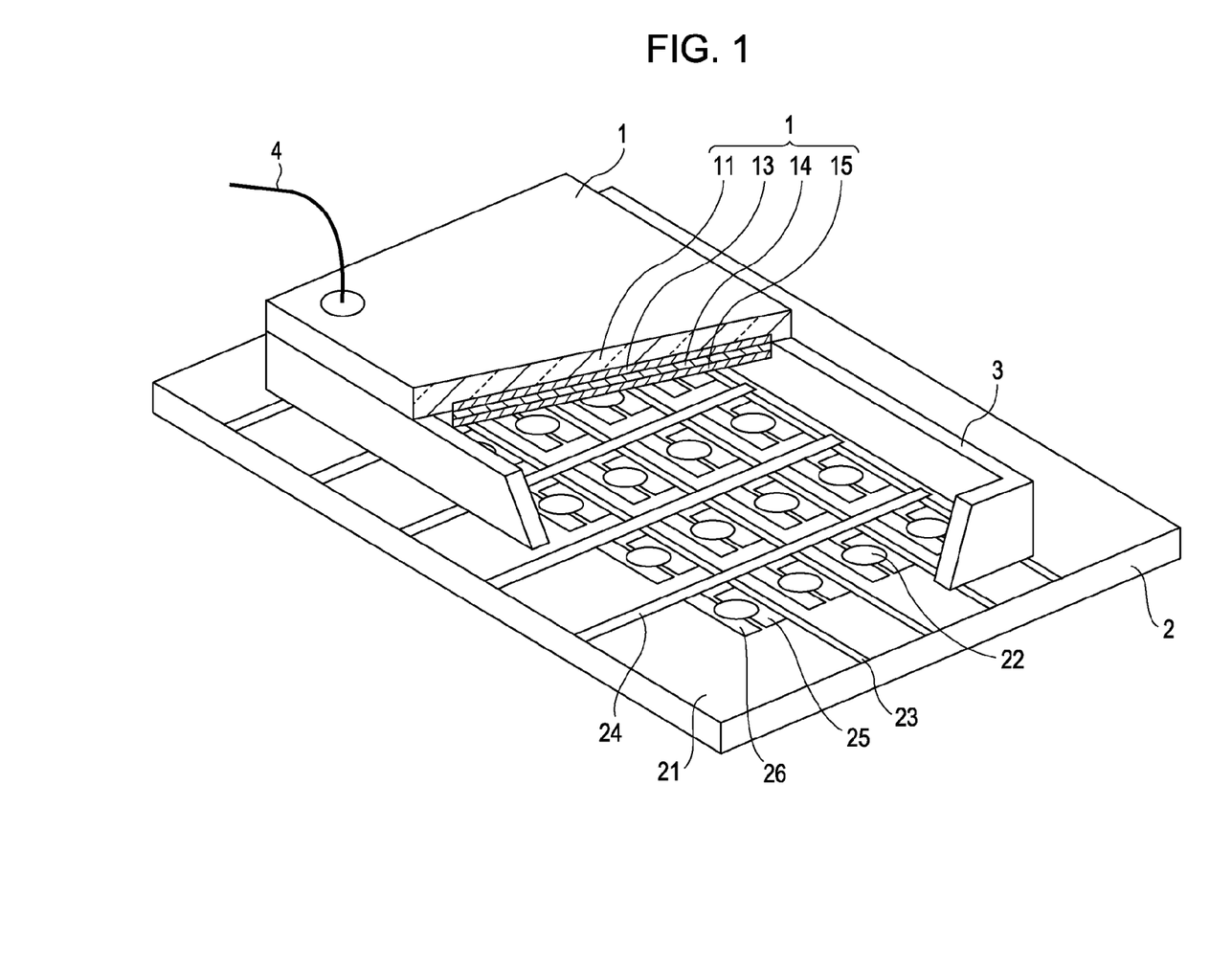
FIG. 1 is a partially cutaway perspective view schematically showing an example of a configuration of an image display apparatus according to the present invention.

FIG. 1 schematically shows an example of a configuration of an image display apparatus according to the present invention. Reference numeral 1 denotes a front substrate (one of a first substrate and a second substrate), and reference numeral 2 denotes a rear substrate (the other). Reference numeral 3 denotes a support frame. The rear substrate 2 and the support frame 3 are bonded to each other using a frit glass or a low melting point metal, and the support frame 3 and the front substrate 1 are bonded to each other using a low melting point metal, thereby forming an envelope (vacuum airtight container).

The front substrate 1 includes a front glass substrate 11, and phosphors (not shown), which serve as light-emitting members, a black matrix 13, a metal back 14, and a nonevaporable getter (hereinafter referred to as NEG) 15 formed on the inner surface of the front glass substrate 11. The portion where the phosphors, the black matrix 13, the metal back 14, and the NEG 15 are formed serves as an image display region.

The rear substrate 2 includes a rear glass substrate 21, and a plurality of electron emitting devices 22, X-direction wiring lines 23, and Y-direction wiring lines 24 formed on the inner surface of the rear glass substrate 21. The portion where the electron emitting devices 22 are formed are also called an image display region. The front substrate 1 and the rear substrate 2 are disposed in such a manner that their respective image display regions face each other so that the phosphors and the electron emitting devices 22 are disposed inside the vacuum airtight container. On one or more Y wiring lines 24 are placed plate-like spacers 5 (not shown in FIG. 1) to withstand the atmospheric pressure.

Figure 2A:
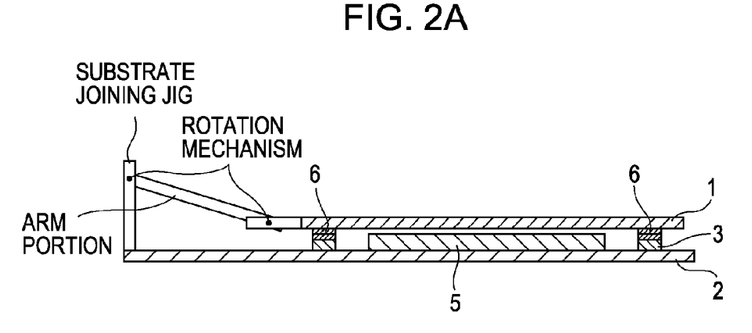
FIGS. 2A to 2C schematically show a first example of the movement of substrates from alignment to bonding in a method for making an image display apparatus according to the present invention.
Figure 2B:
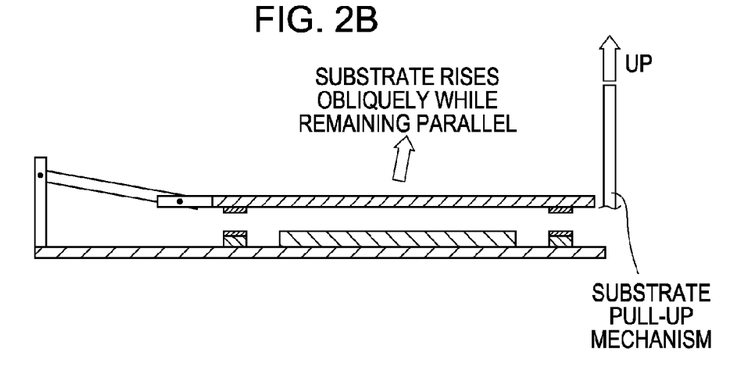
Figure 2C:
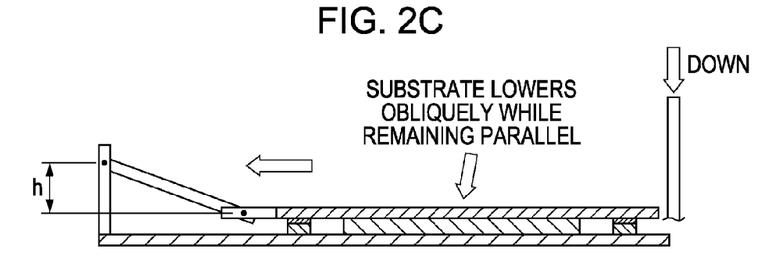

FIGS. 2A to 2C schematically show an example of the movement of substrates in a method for making an image display apparatus according to the present invention. FIG. 2A shows a state where a front substrate 1 and a rear substrate 2 to which a support frame 3 is joined are held in a bonding position after a bonding material 6 is disposed. FIG. 2B shows a state where the distance between the front substrate 1 and the rear substrate 2 to which the support frame 3 is joined is extended. FIG. 2C shows a state where the front substrate 1 and the rear substrate 2 to which the support frame 3 is joined are returned the bonding position after the bonding material 6 is heated. A description will be given step by step. First, to the periphery of the image display region of the rear substrate 2, the support frame 3 is joined in advance using a bonding material such as a low melting point metal or a frit. The bonding material that joins the rear substrate 2 and the support frame 3 is not shown. After joining the support frame 3, a bonding material 6 of a low melting point metal is disposed on the bonding surfaces: the top of the support frame 3 and the part of the front substrate 1 facing the support frame 3.

The low melting point metal is not limited as long as it has a melting point suitable for use as the bonding material 6 and a high sealing performance. For example, indium or an alloy containing indium such as indium-silver or indium-tin can be used.

The amount of the low melting point metal disposed on the support frame 3 and the front substrate 1 is not limited as long as it is sufficient to bond the support frame 3 and the front substrate 1. In the example of FIGS. 2A to 2C, the bonding material 6 is disposed on both the support frame 3 and the front substrate 1. However, the bonding material 6 does not always have to be disposed on both of them and may be disposed on either one of them. However, it is desirable to dispose the bonding material 6 on both of them from the viewpoint of bonding performance.

The method for disposing the low melting point metal on the support frame 3 and the front substrate 1 is not limited as long as it can dispose a predetermined amount of low melting point metal in an intended position. For example, molten low melting point metal may be applied using a nozzle vibrated by ultrasound.

Holding of the front substrate 1 and the rear substrate 2 to which the support frame 3 is joined will be described. For holding both substrates, it is desirable to use a joining jig. The joining jig has a stationary portion the position of which can be fixed and a movable portion that is supported by the stationary portion and holds at least one of two members, i.e., these substrates. The movement of the movable portion around the junction with the stationary portion restricts the movement of the substrate attached to the movable portion.

The joining jig shown in FIGS. 2A to 2C has a stationary portion having an L-shaped cross section and a movable portion (an arm). The stationary portion is provided with a mechanism for holding the rear substrate 2. One end of the arm is joined to the stationary portion. At the other end of the arm is provided a mechanism for holding the front substrate 1. The arm is rotatable relative to the stationary portion around the joint. The arm includes two portions, a first portion and a second portion linked by a joint mechanism, and can be bent and extended. Various known mechanisms in which one member rotates relative to the other member can be used at the junction between the stationary portion and the first portion of the arm and the junction between the first portion and the second portion of the arm. The mechanisms of these junctions may have a limited range of rotation so as not to rotate more than necessary. The overall length of the arm is set in such a manner that the arm can accurately reproduce a predetermined change of the positional relationship between the two substrates. In the example of FIGS. 2A to 2C, one end of the first portion of the arm can move so as to describe an arc orbit in a plane perpendicular to the substrates around the junction with the stationary portion. In addition, the moving range of the junction of the second portion of the arm with the front substrate 1 is restricted in such a manner that the junction describes a predetermined orbit.

After applying the bonding material 6, as shown in FIG. 2A, the front substrate 1 and the rear substrate 2 are aligned in the positional relationship at the time of bonding (bonding position), the rear substrate 2 is joined to the junction of the stationary portion of the joining jig, and one side of the front substrate 1 facing the junction of the rear substrate 2 is joined to the junction of the second portion of the arm of the joining jig. In this way, the front substrate 1 and the rear substrate 2 to which the support frame 3 is joined are held in the bonding position.

The front substrate 1 and the rear substrate 2 can be aligned to each other using a known positioning apparatus. The method for alignment is not limited as long as alignment can be performed in such a manner that the phosphors of the front substrate 1 correspond to the electron emitting devices 22 of the rear substrate 2 and the phosphors emit light.

Any one of the four sides can be selected as one side joined by the substrate joining jig. Any method for joining can be selected as long as the substrate joining jig and the substrates can be reliably joined in spite of the movement of the substrate 1 and the temperature rise during baking. It is desirable that after bonding, the substrate joining jig can be detached from the substrates and reused. Using a heat-resistant inorganic adhesive such as ARON CERAMIC (trade name, produced by Toagosei Co., Ltd.) is one of such methods.

In the case where plate-like spacers 5 are used as shown in FIG. 2A, it is desirable to join the rear substrate 2 to the substrate joining jig in such a manner that the longitudinal direction of the spacers 5 is parallel to the moving direction of the front substrate 1 in the in-plane direction during bonding. By joining in such a manner, the spacers 5 can be prevented from inclining or falling during bonding, and the area of imprints formed in the front substrate 1 by the spacers 5 can be minimized. If a large imprint is formed in the metal back 14, there is a high possibility that electrical discharge occurs near the imprint when a high voltage is applied to the metal back 14. Therefore, it is important to minimize the imprint.

It is desirable to join the substrate joining jig with the front substrate 1 or the rear substrate 2 at two points equally distant from the midpoint of one side of each substrate from the viewpoint of the stability of joining of the substrate and the substrate joining jig.

The substrate joining jig used in the present invention is characterized in that it can move a substrate in the direction perpendicular to the substrate plane, with the relative positions (bonding position) of substrates fixed, and also has a motion component in the substrate in-plane direction.

The substrate joining jig in FIGS. 2A to 2C has a motion component in the substrate in-plane direction, using the movement in the circumferential direction, by setting the difference between the centers of the two rotation mechanisms in coordinate in the direction perpendicular to the substrate plane (the distance shown by h in FIG. 2C) to more than zero. In this substrate joining jig, the larger the value of h, the larger the motion component in the substrate in-plane direction.

One or more such substrate joining jigs can be used in consideration of the sizes of substrates and the size of the substrate joining jig.

The substrate joining jig is required to have such a rigidity that it accurately returns to its original position after moving a substrate in the vertical direction, and to withstand the baking temperature. In addition, since the substrate joining jig undergoes a baking process, the substrate joining jig is desirably formed of a material having a thermal expansion coefficient close to that of the material of the substrates.

After joining the front substrate 1 and the rear substrate 2 with the substrate joining jig, the pair of substrates are placed in a vacuum chamber. Subsequent processes are performed under a vacuum atmosphere.

When the production method of the present invention is used for making an SED, the degree of vacuum is required to be $1.3 \times 10^{-4}$ Pa or less during bonding, and therefore the degree of vacuum in the vacuum chamber is required to be $1.3 \times 10^{-4}$ Pa or less.

In this embodiment, substrates are bonded in a vacuum chamber. The degree of vacuum may be increased after bonding.

The vacuum chamber is provided with a substrate pull-up mechanism for raising and lowering a substrate. As shown in FIG. 2B, the distance between the front substrate 1 and the rear substrate 2 can be extended by catching and pulling up the upper substrate (the front substrate 1 in the figure). In the figure, the substrate pull-up mechanism pulls up the opposite side from the side to which the substrate joining jig is joined. However, by pulling up a plurality of sides at the same time, the front substrate 1 can be stably lifted while remaining parallel. The substrate to be lifted does not always have to be kept parallel. However, if the upper substrate is inclined when the bonding material 6 applied to the upper substrate melts, the bonding material 6 can flow to the lower side. As the result, the thickness of the bonding material 6 can be nonuniform, and the airtightness of the sealed container is likely to be impaired. Therefore, the upper substrate is desirably lifted while remaining parallel.

After extending the distance between the front substrate 1 and the rear substrate 2, the temperature of the pair of substrates is raised above the temperature at which the bonding material 6 (low melting point metal) melts, to perform heating (baking). The baking temperature is at least the temperature at which the low melting point metal melts but below the temperature at which components of the substrates are affected.

After baking and when the pressure in the vacuum chamber has lowered, bonding is performed. The temperature at which bonding is performed is above the melting point of the bonding material 6 but need not be the same as the baking temperature. When performing bonding, the upper substrate is lowered by lowering the substrate pull-up mechanism as shown in FIG. 2C. At this time, although not shown in the figure, by pressing the front substrate 1 from above, more reliable and highly hermetic bonding can be performed. After the molten bonding material 6 on the support frame 3 is brought into contact with the molten bonding material 6 on the upper substrate or the upper substrate by lowering the upper substrate, in the process of further pressing in the direction perpendicular to the substrate plane, the upper substrate also moves in the substrate in-plane direction, the direction parallel to the bonding surface, and the bonding material 6 is pressed while being dragged in the substrate in-plane direction. That is to say, the front substrate 1 is moved relative to the support frame 3 in the direction parallel to the bonding surface with the front substrate 1 and the support frame 3 in contact with the heated bonding material 6 therebetween, and therefore the bonding material 6 is pressed. Dragging the bonding material 6 breaks the surface oxide film of the bonding material 6 (low melting point metal), and highly hermetic bonding can be performed.

In the above bonding, the distance that the upper substrate travels in the substrate in-plane direction, the direction parallel to the bonding surface, in the process of further pressing in the direction perpendicular to the substrate plane after the molten bonding material 6 on the support frame 3 is brought into contact with the molten bonding material 6 on the upper substrate or the upper substrate, is desirably at least 0.3 mm but no more than 1 mm. When the distance is within this range, the surface oxide film of the low melting point metal can be effectively broken, and the upper substrate is not excessively lowered. In this way, the front substrate 1 and the support frame 3 joined to the rear substrate 2 are returned to the bonding position (the initial aligned state).

After pressing the front substrate 1 against the support frame 3, the temperature in the vacuum chamber is lowered below the melting point of the bonding material 6, and the bonding material 6 is completely solidified. Thus, the bonding is completed. After taking the sealed vacuum container (display panel) out of the vacuum chamber, a housing, a drive circuit, and so forth are incorporate therein to complete an SED.

Figure 3A:
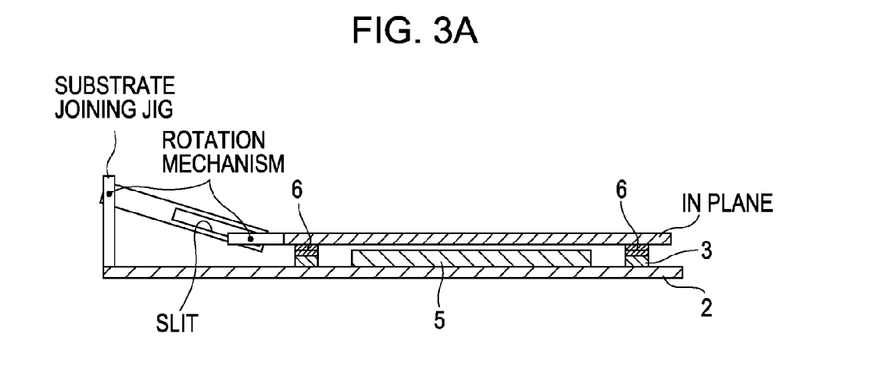
FIGS. 3A to 3C schematically show a second example of the movement of substrates from alignment to bonding in a method for making an image display apparatus according to the present invention.
Figure 3B:
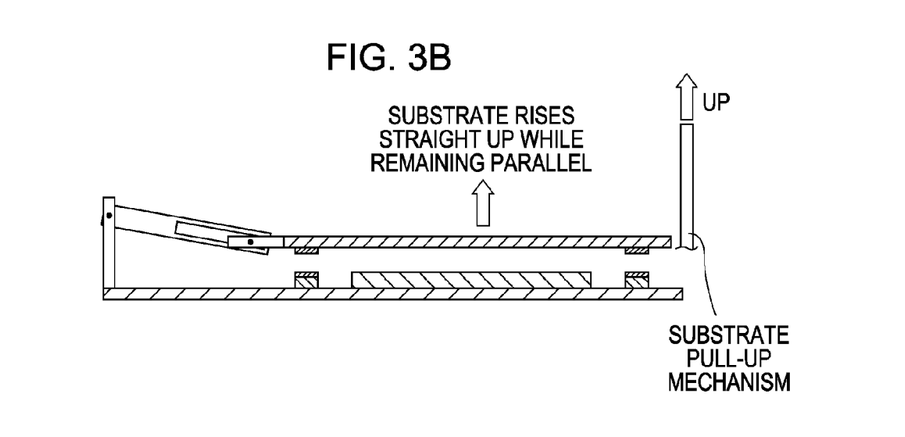
Figure 3C:
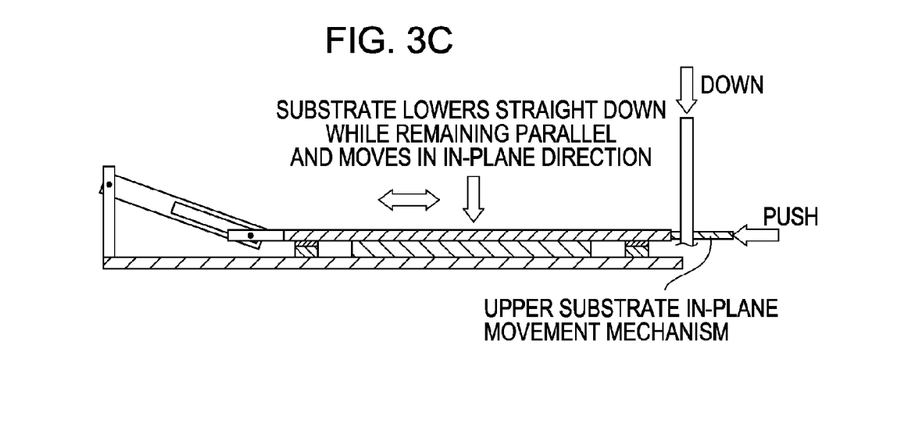

The substrate joining jig of FIGS. 2A to 2C generates movements in the direction perpendicular to the substrate plane (such a direction that the distance between the substrates is extended) and in the substrate in-plane direction (the direction parallel to the bonding surface) at the same time, using circular motion. Alternatively, a substrate joining jig may be used that can separately perform movements in the direction perpendicular to the substrate plane and in the substrate in-plane direction. FIGS. 3A to 3C schematically show the movement of substrates in a method for making a vacuum airtight container according to the present invention in the case where such a substrate joining jig is used.

FIG. 3A shows a state where a front substrate 1 and a rear substrate 2 to which a support frame 3 is joined are held in a bonding position after a bonding material 6 is disposed. FIG. 3B shows a state where the distance between the front substrate 1 and the rear substrate 2 to which the support frame 3 is joined is extended. FIG. 3C shows a state where the front substrate 1 and the rear substrate 2 to which the support frame 3 is joined are returned to the bonding position after the bonding material 6 is heated. The substrate joining jig of FIGS. 3A to 3C has a slit in its arm portion. The substrate-side rotation mechanism can be freely slid in the direction of the slit. Therefore, the radius of rotation is variable unlike the substrate joining jig of FIGS. 2A to 2C, and the movements of the upper substrate in the direction perpendicular to the substrate plane and in the substrate in-plane direction (the direction parallel to the bonding surface) are separable. Unlike the case of FIGS. 2A to 2C, the force pressing in the direction perpendicular to the substrate plane does not contribute to moving the upper substrate in the substrate in-plane direction (the direction parallel to the bonding surface). Therefore, another force that moves the upper substrate in the substrate in-plane direction is necessary. The upper substrate in-plane movement mechanism shown in FIG. 3C is a mechanism for moving the upper substrate in the substrate in-plane direction. After the upper substrate is moved in the direction perpendicular to the substrate plane and the bonding material 6 on the support frame 3 is brought into contact with the bonding material 6 on the upper substrate or the upper substrate, the upper substrate in-plane movement mechanism moves the upper substrate in the substrate in-plane direction (the direction parallel to the bonding surface), and then the upper substrate is pressed from above against the support frame 3.

Figure 4:
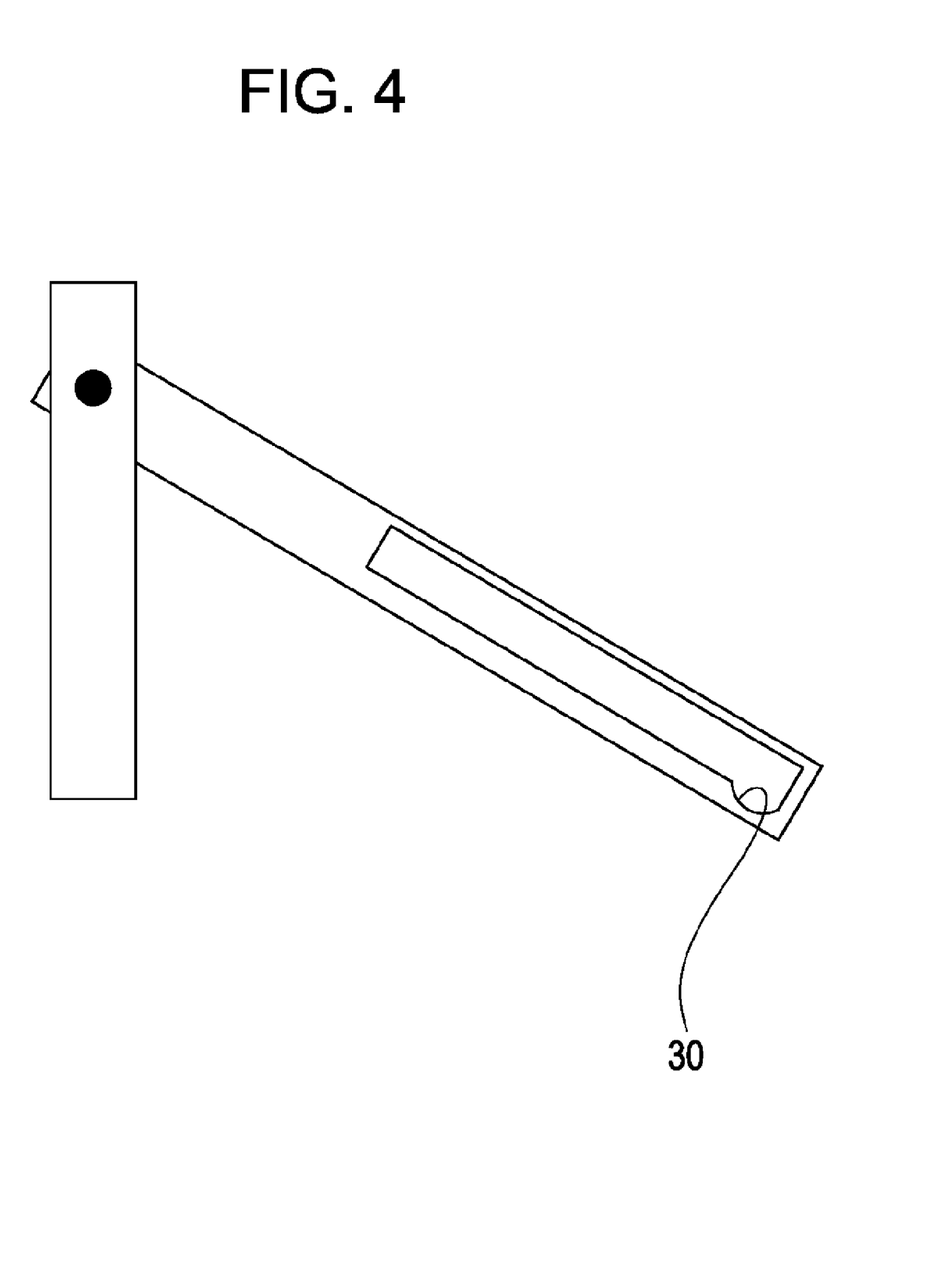
FIG. 4 is a schematic view of an arm that has a depression in the slide portion.

At this time, the movement in the substrate in-plane direction needs to be performed in such a manner that the substrates are brought into the initial aligned position (bonding position). For this purpose, the sliding portion may be provided with a depression 30 as shown in FIG. 4 so that the aligned position can be grasped from the depression 30. Alternatively, at the time of the initial alignment, the upper substrate may be shifted beforehand by the distance that the upper substrate travels in the substrate in-plane direction so that the upper substrate can be bonded in an accurate position after travelling in the substrate in-plane direction.

The travel distance in the substrate in-plane direction (the bonding surface direction) is desirably at least 0.3 mm but no more than 1 mm because the phosphors of the front substrate 1 correspond to the electron emitting devices 22 of the rear substrate 2, the surface oxide film of the low melting point metal is broken, and the vacuum airtight container does not leak. As long as the travel distance is within the above range, the upper substrate may be moved in one direction or back and forth.

Processes other than those described above are the same as those shown in FIGS. 2A to 2C.

The substrate joining jig shown in FIGS. 3A to 3C may be used as the substrate joining jig shown in FIGS. 2A to 2C by fixing the substrate-side rotation mechanism in any position in the slit. In this case, the movement direction component in the substrate in-plane direction of the circular movement of the upper substrate can be varied by varying h in FIG. 2C.

EMBODIMENTS

The present invention will be described in detail in embodiments. The present invention is not intended to be limited to these embodiments.

First Embodiment

This embodiment is an example of an SED shown in FIG. 1. Processes to which the present invention is applied will be described in detail.
(1) Front Substrate Forming Process
A glass "PD-200" (trade name, produced by Asahi Glass Co., Ltd.), which is reduced in the content of alkaline components, 2.8 mm thick was used as a front glass substrate 11. After sufficiently washing the glass substrate, a film of ITO (Indium-Tin Oxide) 100 nm thick was deposited on the glass substrate by sputtering to form a transparent electrode. Subsequently, a phosphor film was applied thereto by printing, and surface smoothing processing called "filming" was performed to form phosphors.

The phosphors were arranged in a matrix. Red, green, and blue-striped phosphors and black conductive members were alternately arranged. One pixel includes red, green and blue subpixels, and the number of pixels is 720×160.

Furthermore, a metal back 14, an aluminum thin film about 100 nm thick was formed on the phosphors and the black matrix 13 (the whole surface of the image display portion) by electron beam vapor deposition.

After forming the metal back 14, the filming was removed by baking in air. The wiring lines for electrically connecting the metal back 14 to a high voltage terminal 4 is previously formed by printing and baking of a silver paste.
(2) NEG Forming Process
After removing the filming, an NEG 15 was formed on the front substrate 1. Specifically, a film of titanium about 350 nm thick was formed by electron beam vapor deposition. To prevent the deterioration in luminance due to the titanium film, the phosphors were previously masked by a metal mask and titanium was deposited only on the black matrix 13.
(3) Rear Substrate Forming Process
A glass "PD-200" (trade name, produced by Asahi Glass Co., Ltd.), which is reduced in the content of alkaline components, 2.8 mm thick was used as a rear glass substrate 21. Device electrodes 25 and 26 were formed by first forming a titanium film 5 nm thick as an underlying layer on the rear glass substrate 21 by sputtering, forming a platinum film 40 nm thick on the titanium film by sputtering, applying a photoresist, and then performing patterning by photolithography including exposure, development and etching.

Next, X-direction wiring lines 23 were formed so as to be in connect with the device electrodes 25 and to link these device electrodes. The X-direction wiring lines 23 were 10 μm in thickness and 50 μm in width, and were formed by screen printing using a silver photo-paste ink.

Next, an interlayer insulation layer for insulating the X-direction wiring lines 23 from Y-direction wiring lines 24 was disposed.

The Y-direction wiring lines 24 were formed on the insulation layer by screen printing using a silver paste ink. The Y-direction wiring lines 24 intersect with the X-direction wiring lines 23 with the insulation layer therebetween, and the Y-direction wiring lines 24 are connected to the device electrodes 26 through contact holes in the insulation layer. The device electrodes 26 are linked by the Y-direction wiring lines 24, and serve as scanning electrodes after the panel was formed. The thickness of the Y-direction wiring lines 23 is about 15 μm.
(4) Device Film Applying Process
Electron emitting devices (device films) 22 were applied between the device electrodes 25 and 26 by an ink jet method. A solution containing organopalladium obtained by dissolving a palladium-proline complex of 0.15% by weight in an aqueous solution of 85% water and 15% isopropyl alcohol (IPA) was used as the device films.
(5) Device Film Forming Process
The formed device films 22 were subjected to an energization processing in a reductive atmosphere called "forming" to form a several nanometer gap in the device films.
(6) Device Activation
The electron emission efficiency of the device films immediately after the forming is very low. Therefore, a processing called "activation" was performed to increase the electron emission efficiency.

This processing was performed by repeatedly applying a pulse voltage to the device electrodes 25 and 26 through the X-direction wiring lines 23 and the Y-direction wiring lines 24 in an atmosphere at an appropriate pressure in which an organic compound exits.

(7) Support Frame Forming Process

After the device activation, a support frame 3 that was formed of the "PD-200" glass and 8 mm in width and 1.2 mm in height was fixed on the periphery of the image display range of the rear substrate 2 using a glass frit.

(8) Spacer Placing Process

After that, thin plate-like spacers 5 that were formed of the "PD-200" glass and 1.8 mm in height, 0.2 mm in thickness, and 180 mm in length were placed on the Y-direction wiring lines 24 in such a manner that the direction in which the Y-direction wiring lines 24 extend is parallel to the longitudinal direction of the spacers 5.

(9) Bonding Material (Low Melting Point Metal) Disposing Process

The front substrate 1 and the rear substrate 2 are placed on a hot plate heated at about 110° C. Indium (melting point: 157° C.) melted in an electric melting pot was applied to the bonding portion on the periphery of the image display range of the front substrate 1 and the support frame 3 joined to the rear substrate 2 using a nozzle having a bore diameter of about 4 mm and vibrated by ultrasound. The height of the formed indium films is about 0.3 mm.

(10) Process of Holding in Bonding Position (FIG. 2A)

After applying indium to the front substrate 1 and the support frame 3 joined to the rear substrate 2, alignment was performed so that the phosphors of the front substrate 1 positionally correspond to the electron emitting devices of the rear substrate 2 with the indium films facing each other. After aligning the front substrate 1 and the rear substrate 2 in the bonding position, one side of the front substrate 1 and one side of the rear substrate 2 (a side perpendicular to the direction in which the Y-direction wiring lines 24 extend) were joined using the substrate joining jig shown in FIGS. 2A to 2C. Each substrate was joined to the joining jig at two points equally distant from the midpoint of one side of the substrate. The substrate joining jig was formed of titanium, which has a thermal expansion coefficient close to that of glass. The value of h in FIG. 2C was 30 mm.

(11) Process of Extending Distance and Heating (Baking) Process (FIG. 2B)

The joined front substrate 1 and rear substrate 2 were placed in a vacuum chamber with the front substrate 1 up. The pressure in the vacuum chamber was $5 \times 10^{-6}$ Pa. After that, the front substrate 1 was lifted by the substrate pull-up mechanism, and heating was started with the distance between the front substrate 1 and the support frame 3 joined to the rear substrate 2 extended. The baking temperature was 350° C., and the baking time was one hour. This baking process doubles as an NEG activation process.

(12) Process of Returning to Bonding Position and Bonding Process (FIG. 2C)

After baking at 350° C. for one hour, the temperature was lowered to 180° C., the substrate pull-up mechanism was lowered, and a load was applied to the front substrate 1 from above. The front substrate 1 and the support frame 3 joined to the rear substrate 2 were thereby brought into contact with each other with the bonding material 6 therebetween. Next, the front substrate 1 was moved in the direction parallel to the bonding surface (the substrate in-plane direction) by the joining jig while remaining in contact with the support frame 3. While pressing the bonding material 6 and breaking the surface oxide film of the surface of the bonding material 6, the front substrate 1 and the rear substrate 2 were returned to the bonding position. After returning to the bonding position, the temperature is returned to the room temperature to solidify the bonding material 6 and to bond the front substrate 1 to the support frame 3 joined to the rear substrate 2.

(13) Panel Forming Process

The sealed vacuum container was took out of the vacuum chamber and incorporated into a housing together with a drive circuit to form an SED as an image display apparatus.

The SED made through the above-described processes has highly accurately aligned substrates and can therefore display a high-definition image free from color misregistration. In addition, the SED is highly hermetically sealed and therefore has a long life.

Second Embodiment

Instead of using the substrate joining jig used in the first embodiment and described in FIGS. 2A to 2C, the substrate joining jig described in FIGS. 3A to 3C was used. The second embodiment is the same as the first embodiment except for the process of returning to the bonding position.

In the process of returning to the bonding position in this embodiment, when the substrate pull-up mechanism was lowered and the front substrate 1 and the support frame 3 joined to the rear substrate 2 were brought into contact with each other with the bonding material 6 therebetween, the front substrate 1 was moved by 0.5 mm in the longitudinal direction of the spacers 5 by the upper substrate in-plane movement mechanism as shown in FIG. 3C. After moving, a load was applied to the front substrate 1 from above.

The SED made by this embodiment also has highly accurately aligned substrates and can therefore display a high-definition image free from color misregistration. In addition, the SED is highly hermetically sealed and therefore has a long life.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-224818 filed Sep. 2, 2008 and No. 2009-181486 filed Aug. 4, 2009, which are hereby incorporated by reference herein in their entirety.

What is claimed is:

1. A method for making a vacuum airtight container comprising the steps of:

(a) disposing a metal-bonding material on a bonding surface of at least one of a first member and a second member constituting the vacuum airtight container;

(b) bringing the first member and the second member into contact with each other with the metal-bonding material therebetween and holding the first member and the second member in a bonding position;

(c) moving at least one of the first member and the second member held in the bonding position relative to the other so as to extend the distance between the first member and the second member;

(d) heating the metal-bonding material above a temperature at which the metal-bonding material melts;

(e) bringing the first member and the second member into contact with each other with the heated metal-bonding material therebetween, moving at least one of the first member and the second member in a direction parallel to the bonding surface while keeping the first member and the second member in contact with each other so as to break a surface oxide film of the bonding material formed during step (d), and thereby returning the first member and the second member to the bonding position while pressing the metal-bonding material; and (f) bonding the first member and the second member returned to the bonding position by cooling and solidifying the metal-bonding material, wherein the steps (c), (d), (e), and (f) are performed under a vacuum atmosphere.

2. A method for making an image display apparatus that has light emitting members and electron emitting devices in a vacuum airtight container made by hermetically bonding a first substrate and a second substrate with a support frame therebetween, the method comprising the steps of:

(a) joining the support frame to the second substrate and disposing a metal-bonding material on a bonding surface of at least one of the first substrate and the support frame joined to the second substrate;

(b) bringing the first substrate and the support frame joined to the second substrate into contact with each other with the metal-bonding material therebetween and holding the first substrate and the support frame joined to the second substrate in a bonding position;

(c) moving at least one of the first substrate and the support frame joined to the second substrate held in the bonding position relative to the other so as to extend the distance between the first substrate and the support frame joined to the second substrate;

(d) heating the metal-bonding material above a temperature at which the metal-bonding material melts;

(e) bringing the first substrate and the support frame joined to the second substrate into contact with each other with the heated metal-bonding material therebetween, moving at least one of the first substrate and the support frame joined to the second substrate in a direction parallel to the bonding surface while keeping the first substrate and the support frame joined to the second substrate in contact with each other so as to break a surface oxide film of the bonding material formed during step (d), and thereby returning the first substrate and the support frame joined to the second substrate to the bonding position while pressing the metal-bonding material; and (f) bonding the first substrate and the support frame joined to the second substrate returned to the bonding position by cooling and solidifying the metal-bonding material, wherein the steps (c), (d), (e), and (f) are performed under a vacuum atmosphere.

3. The method according to claim 1, wherein the vacuum airtight container further has a plate-like spacer, and the direction in which at least one of the first member and the second member is moved in the step (e) is a direction parallel to the longitudinal direction of the plate-like spacer.

4. The method according to claim 2, wherein the image display apparatus further has a plate-like spacer, and the direction in which at least one of the first substrate and the support frame joined to the second substrate in the step (e) is a direction parallel to the longitudinal direction of the plate-like spacer.

* * * * *